United States Patent [19]

Hollmann

[11] Patent Number: 4,706,798
[45] Date of Patent: Nov. 17, 1987

[54] OVERHEAD CASE POSITIONER

[76] Inventor: Joseph L. Hollmann, 1617 W. Belmar Pl., Cincinnati, Ohio 45224

[21] Appl. No.: 926,208

[22] Filed: Nov. 3, 1986

[51] Int. Cl.⁴ .............................................. B65G 47/24
[52] U.S. Cl. .................................... 198/399; 198/395; 414/780
[58] Field of Search ............ 198/395, 413, 399, 463.5, 198/463.6; 414/774, 780, 784

[56] References Cited

U.S. PATENT DOCUMENTS

| | | |
|---|---|---|
| 1,945,888 | 2/1934 | Fields . |
| 3,024,890 | 5/1958 | Belk ................................ 198/463.5 X |
| 3,275,122 | 9/1966 | Carlson . |
| 3,724,641 | 4/1973 | Wainwright et al. ................ 198/395 |
| 3,863,757 | 2/1975 | Kinney . |
| 3,993,187 | 11/1976 | Knez . |
| 4,484,675 | 11/1984 | Doherty et al. . |
| 4,596,326 | 6/1986 | Yautz ................................. 198/463.6 |

Primary Examiner—Robert J. Spar
Assistant Examiner—Jennifer Doyle
Attorney, Agent, or Firm—Wood, Herron & Evans

[57] ABSTRACT

An overhead case positioner for inverting upended cases, including a detector for sensing the presence of an upended case moving along a conveyor, a first stop for retarding movement of the upended case, a second stop for retarding movement of the succeeding case, a third stop spaced downstream of the first for engaging the upended case after it has been released by the first stop and an inverter mechanism for pivoting an upended case in abutment with the third stop forwardly over the third stop.

9 Claims, 10 Drawing Figures

OVERHEAD CASE POSITIONER

BACKGROUND OF THE INVENTION

The present invention relates to positioners for automatically repositioning cases which have been deposited on a conveyor in an improper orientation. In the dairy industry, it is common to transport cartons of milk from the dairy to customers in cases formed of plastic, wire or the like. These cases are of various sizes, such as 13"×13", 13"×16", and have four rectangular side walls and a rectangular bottom with an open top.

In a typical dairy installation, these cases are returned to the dairy, are stacked into vertical stacks, and are fed to a unit called an unstacker. The unstacker feeds the cases one stack at a time to an elevated, horizontal conveyor called the run-off section. From this section, the cases are fed to a second horizontal conveyor and are inverted as they are deposited onto the conveyor. The overhead conveyor is usually positioned approximately eight feet above the floor and is effective to transfer the inverted cases to a washer or other piece of equipment.

In normal operation, the unstacker is effective to properly invert the vast majority of cases. However, in most dairies a number of cases, for example, ten a day, are not properly positioned on the conveyor with their open top facing downwardly, but rather are left upended, i.e., in a position in which the case is standing on one end with its open top facing forwardly. In the past, it has been necessary to have a workman straighten out the resulting jam which is caused by one of these upended cases. When a jam occurs, it results in a shutdown of the case-loading equipment for a period of from three to four minutes.

In the past, in other fields there have been proposed various mechanisms for reorienting, or inverting, various articles, such as lids, plates, boards, caps or the like. Typical mechanisms are shown in U.S. Pat. Nos. 1,945,888; 3,275,122; 3,863,757; 3,993,187 and 4,484,675. However, none of these mechanisms was either intended to, or capable of, automatically repositioning upended cases of the type described.

SUMMARY OF THE INVENTION

The principal object of the present invention is to provide a case positioner for automatically inverting upended cases passing along a conveyor.

It is a further object of the present invention to provide a case positioner which is effective to invert an upended case in a minimum amount of time so that the interruption of the operation of the unstacker is minimal.

It is a further object of the present invention to provide a case positioner of simple construction which is compatible with various types of conveyor systems and which can be installed in any desired area along a conveyor.

It is a still further object of the present invention to provide an overhead case positioner which is easily installed and maintained and is reliable in operation.

More particularly, the present invention is predicated upon the concept of providing a case positioner having a detector for sensing the presence of an upended case. The positioner further comprises a first stop actuated in response to the detection of an upended case and effective to stop forward movement of the case along the continuously moving conveyor. The case positioner also includes a second stop effective to engage the case immediately following the upended case and a third stop spaced downstream from the first stop. The third stop includes a member shiftable upwardly between the conveyor chains to engage the leading edge of an upended case. Finally, the case positioner includes an inverter mechanism having an upwardly pivotal arm adapted to engage the bottom wall of an inverted case held by the third stop and to pivot the case forwardly over the stop to a fully inverted position.

In accordance with the present invention, a control is provided which initially actuates the first stop to retard an upended case as soon as its presence is sensed. After a predetermined time interval sufficient to allow the preceding case to move along the conveyor a distance greater than the height of a case and beyond the third stop, the first stop is retracted, allowing the upended case to resume its movement along the conveyor. This time delay has created a spacing between the upended case and the case which preceded it sufficient to permit the upended case to be overturned forwardly without striking the case ahead of it.

At the same time that the first stop is retracted, the second stop is advanced to clamp the succeeding case, and all cases behind it to prevent their further movement along the conveyor. Concurrently with the actuation of the first two steps, the third stop is actuated, i.e., is raised between the conveyor chains. After the passage of a sufficient time to allow the upended case to move into engagement with the third stop, the inverter mechanism is actuated to cause the inverter plate to be pivoted upwardly, causing the upended case to pivot forwardly over the third stop into its proper, inverted, top-down position. Thereafter, the second and third stops and inverter are retracted and the conveyor returns to its normal operation.

One advantage of the present positioner is that it is automatic in operation and requires only a few seconds to correct the position of an upended case.

A further advantage of the present inverter is that it is fabricated from simple components which are readily installed in any desired location along a conveyor and after installation are reliable in operation with minimal maintenance.

These and other objects and advantages of the present invention will be more readily apparent from the following detailed description of the drawings illustrating a preferred embodiment of the invention.

DETAILED DESCRIPTION OF THE DRAWINGS

Figure 6:
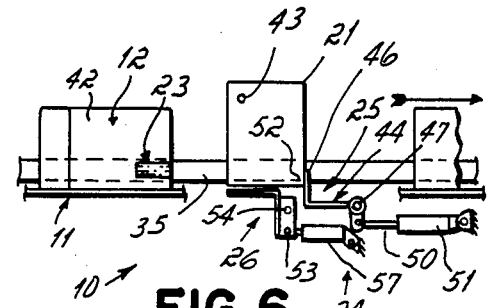
FIG. 6 is a view similar to FIG. 5 and further showing the upended case being retarded by a third stop forming part of the positioner.
Figure 9:
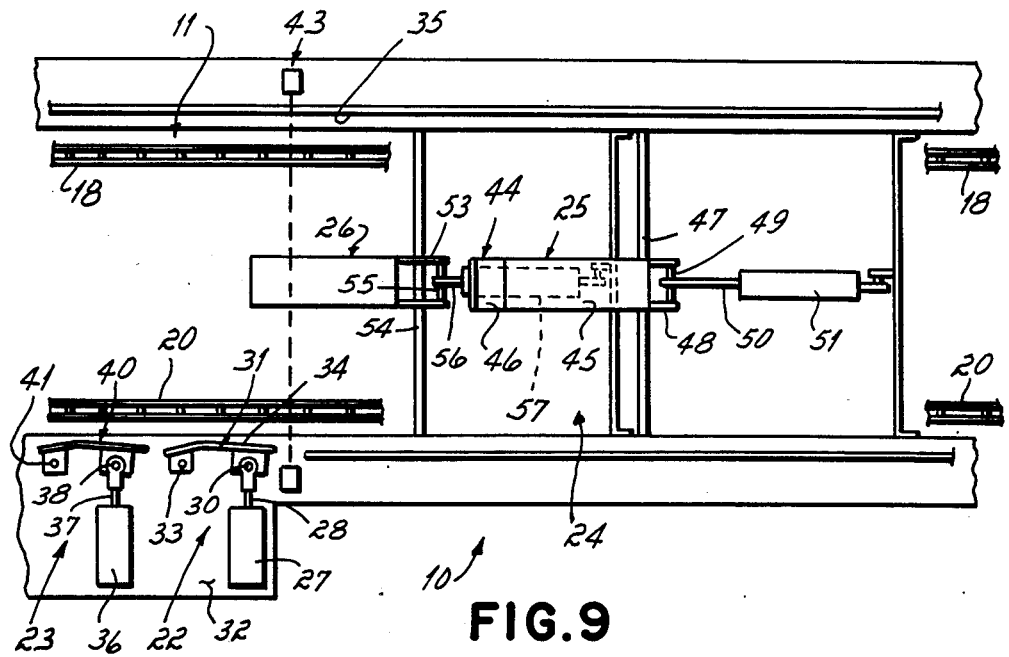
FIG. 9 is a semi-diagrammatic top view of a preferred embodiment of the case positioner.

The overall construction of a preferred embodiment of an overhead case positioner 10 is best shown in FIGS. 6 and 9. As there shown, the case positioner is adapted to cooperate with a section of a conveyor 11 of the type used in dairies to convey cases 12 between an unstacker (not shown) and a washer (not shown).

Figure 1:
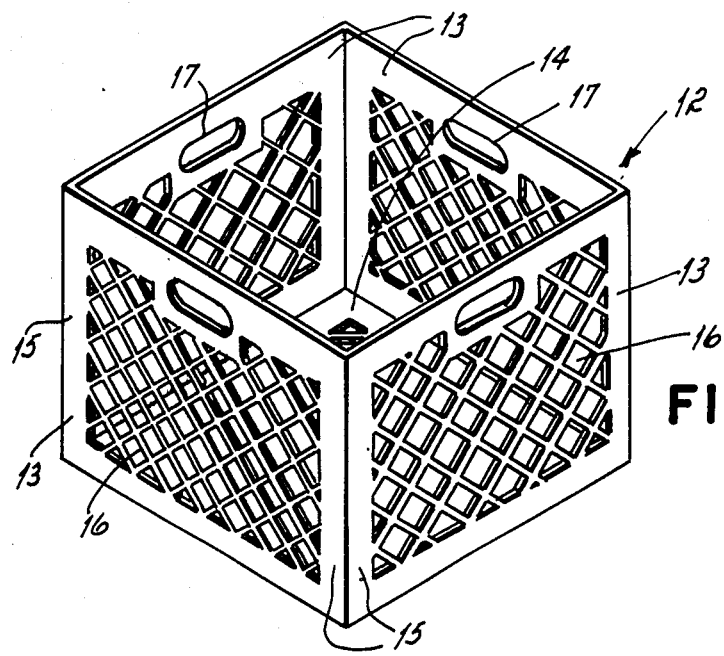
FIG. 1 is a semi-diagrammatic perspective view of a case of the type conventionally used by dairies to transport cartons of milk.

Cases 12 of the type handled by the present case positioner are used by dairies to transport cartons of milk. FIG. 1 illustrates semi-diagrammatically one typical form of such case, the details of which form no part of the present invention. The case illustrated includes rectangular side walls 13 and a rectangular bottom wall 14. The top of the case is open. Typical cases are formed of plastic having solid sections 15 adjacent the edges, a lattice work 16 in the center section of each wall and suitable hand openings 17. The cases as returned to the dairy often contain pieces of trash of one kind or another. These cases are stacked into a vertical stack and are fed to an unstacker. The construction of an unstacker is well known in the art and constitutes no part of the present invention.

Essentially, the unstacker successively separates stacks of cases and places them on a run-off section of a conveyor (not shown). Individual cases drop from this section in an inverted position with their open top down onto an intermediate conveyor, such as conveyor 11, which conveys the cases to a loop inverter which returns the cases to their upright position at the in-feed level of the caser, which deposits filled milk cartons in the cases.

The details of construction of conveyor 11 are also well known in the art. Essentially, this conveyor is an elevated conveyor typically positioned approximately 8 feet above floor level. The conveyor 11 comprises two spaced chains 18 and 20. These chains are driven continuously and are shown as moving from left to right in FIGS. 2–9.

Figure 2:
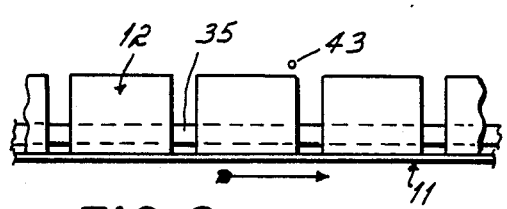
FIG. 2 is a semi-diagrammatic side view of a section of a conveyor adjacent to the positioner (not shown) and intermediate an unstacker and a washer, the conveyor carrying cases in an inverted position.
Figure 3:
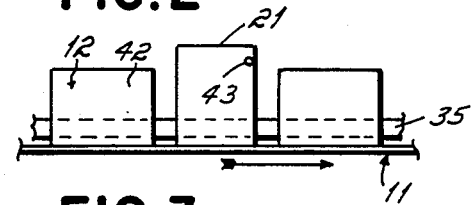
FIG. 3 is a view similar to FIG. 2 showing an upended case on the conveyor.

Commercial unstackers are effective to properly invert the great majority of cases 12 so that they are carried by conveyor 11 in their proper inverted position as shown in FIG. 2. In normal operation, cases 12 move along the conveyor 11 with a slight spacing, e.g., 2 inches, between successive cases. Occasionally, however, a case, such as case 21, is not inverted as it drops onto conveyor 11, but rather is deposited on conveyor 11 in an upended position as shown in FIG. 3.

In accordance with the present invention, the case positioner 10 is installed along conveyor 11 at a location intermediate the stacker and loop inverter. The case positioner functions to sense the presence of an upended case, such as case 21, and to automatically pivot the upended case to its proper or inverted position. The case positioner comprises a first lateral stop 22 effective to engage the side of the upended case to stop its movement along conveyor 11. It is to be understood that stop 22 and the other components of the positioner are either mounted on a separate frame or, alternatively, on structural members of the support for conveyor 11.

A second lateral stop 23 is mounted in an upstream direction from stop 22 and an inverter mechanism 24 is spaced downstream from first stop 22. The inverter mechanism includes a third stop 25 effective to arrest the leading edge of an upended case and a kicker arm 26 effective to pivot the case over the third stop to its proper inverted position.

More particularly, as is best shown in FIG. 9, first lateral stop 22 includes a pneumatic cylinder 27 mounted adjacent to one side of conveyor 11 with the axis of the cylinder being disposed in a horizontal plane. The rod 28 attached to the piston of this cylinder is pivotally connected as at 30 to a plate 31. The end of this plate remote from pivotal connection 30 is pivotally mounted to a support member 32 by means of pin 33.

Plate 31 is angulated and has a main section 34 which normally extends generally parallel to, and is spaced laterally of, conveyor chains 18 and 20. However, when pressure is applied to cylinder 27 and rod 28 is advanced, plate 31 pivots toward the conveyor to a position in which it engages the side of an upended case 21 on conveyor 11 and wedges that case against a stationary rail 35 which extends above and parallel to conveyor chain 18. The case is thus held stationary while the conveyor chains move under it.

The construction of second stop 23 is identical to first stop 22. More particularly, stop 23 includes cylinder 36 having a ram connected to a rod 37 which is in turn pivotally connected as at 38 to a plate 40. Plate 40 is angulated in the same manner as plate 31 and is pivotally suported to support member 32 as by means of pin 41. Plate 40 is normally spaced laterally from chain 20, but can be pivoted inwardly to wedge a case against rail 35.

Figure 5:
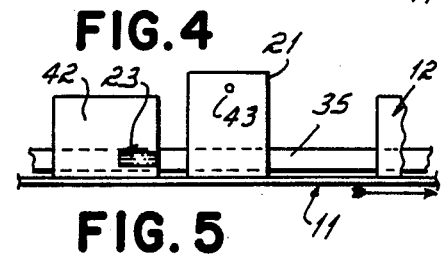
FIG. 5 is a view similar to FIG. 4 showing the upended case released for continued movement while the following case is held by a second stop of the positioner.

Second stop 23 is spaced upstream, i.e., in a direction opposite the movement of conveyor 11, from first stop 22. The spacing between stops 22 and 23 is such that when first stop 22 engages an upended case, such as case 21 (FIG. 23), the second stop 23 does not engage the upended case, but rather engages the succeeding case 42 as illustrated in FIG. 5.

The case positioner further includes an upended case sensor 43 (FIGS. 2–9). This sensor can be of any suitable type, such as a microswitch operated by an elongated horizontally-extending rod, for sensing the presence of an upended case, such as case 21. One preferred form of sensor is a photoelectric switch mounted at one side of conveyor 11 above the first stop 22. A light source is mounted on the opposite side of the conveyor from the photoelectric receiver of the switch in alignment therewith. Both the receiver and source are mounted at a height above properly positioned cases, as illustrated in FIG. 2, but in an area where the light path is interrupted by an upended case 21 as illustrated in FIG. 3.

In addition to these components, the case positioner includes an inverter mechanism 24. This inverter mechanism is disposed downstream of first stop 22. The inverter mechanism includes third stop 25. As illustrated in FIGS. 6–9, this stop includes a right-angled stop arm 44 disposed below and between chains 18 and 20. Arm 44 has a generally horizontal section 45 and an upstanding section 46. The end of generally horizontal section 45 is pivotally mounted on shaft 47 and is connected to links 48. Links 48 are in turn connected by pin 49 to rod 50 of air cylinder 51.

Figure 8:
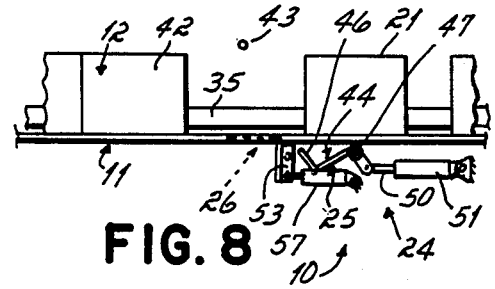
FIG. 8 is a view similar to FIG. 7 showing the third stop retracted to free the inverted case for continued movement, while the succeeding case has been freed from continued movement by retraction of the second stop.

As illustrated in FIG. 6, when pressure is applied to air cylinder 51 so that rod 50 is advanced, arm 44 is pivoted to raise vertical section 46 upwardly between conveyor chains 18 and 20. In this position the end of vertical section 46 engages the advancing edge 52 of an upended case. When the ram of cylinder 51 is actuated in the reverse direction and rod 50 is retracted, plate 44 is pivoted in a counterclockwise direction. This movement brings vertical section 46 of stop plate 44 to a position beneath conveyor chains 18 and 20 so that it does not interfere with the passage of cases along the conveyor, as shown in FIGS. 8 and 9.

Inverter mechanism 24 also includes a kicker plate 26 located below and between chains 18 and 20. This plate is mounted on arms 53 which are pivotally carried by a horizontal shaft 54. Arms 53 are connected by pin 55 to rod 56 carried by the ram of air cylinder 57. Cylinders 51 and 57 are secured to a suitable frame member as indicated diagrammatically in FIGS. 6–8.

Figure 7:
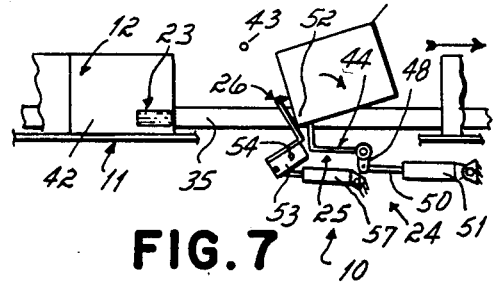
FIG. 7 is a view similar to FIG. 6 showing the upended case being pivoted to an inverted position by a kicker arm of the positioner.

In its normal position, when no pressure is applied to cylinder 57, the kicker plate 26 lies in a substantially horizontal plane beneath conveyor chains 18 and 20. In this position it does not impede movement of cases along the conveyor 11. However, when stop 46 is raised and pressure is applied to cylinder 57, kicker plate 26 is pivoted in a clockwise direction upwardly as shown in FIG. 7, whereupon it lifts the rear edge of an upended case which is being held by stop 46 and pivots that case upwardly over stop 46 so that the case is rotated to its proper inverted position as shown in FIGS. 7 and 8.

Figure 10:
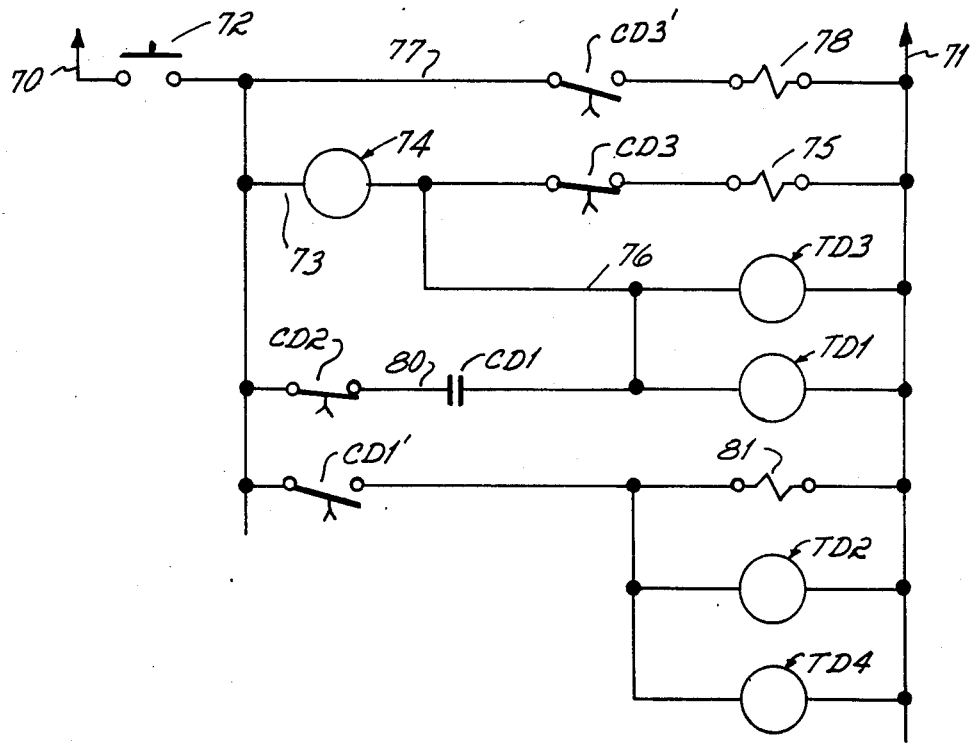
FIG. 10 is a schematic drawing of a control circuit for operating the positioner of this invention.

The control circuit for controlling the sequence of operation of the stops and inverter mechanism is shown in FIG. 10. As there shown, power, e.g., 110 volt, 60 cycle power, is supplied through lines 70, 71. Line 70 contains a conventional on-off switch 72. A lead 73 is connected between lines 70, 71 through photosensitive switch 74 forming part of sensor 43. This switch may be of any suitable form, for example, a modulated LED photoreceiver relay. This relay is normally open, but is closed whenever a light beam from the source is interrupted by an upended case, such as case 21.

Lead 73 also includes series connected, normally closed contacts CD3 of time delay relay TD3 and solenoid coil 75. Coil 75 is part of a solenoid valve (not shown) which controls the flow of air to cylinder 27 of first stop 22. Time delay relay TD3 is shunted across normally closed contacts CD3 and solenoid coil 75 by means of lead 76. A lead 77 is connected across power lines 70, 71 through series connected, normally open contacts CD3' of time delay relay TD3 and solenoid coil 78. Solenoid coil 78 is part of a solenoid-operated valve (not shown) which controls the admission of pressurized air to cylinder 36 of second stop 23 and cylinder 51 of third stop 25.

Another time delay relay TD1 is shunted across time delay relay TD3. Time delay relay TD1 has two sets of contacts, a normally open set of contacts CD1, which are closed instantaneously upon the energization of relay TD1, and a second set of normally open contacts CD1' which are closed after a predetermined interval, for example, one-half second. Contacts CD1 are interconnected in series with lead 80 and normally closed contacts CD2 of time delay relay TD2 and time delay relay TD1.

Normally open contacts CD1' of relay TD1 are connected across power lines 70, 71 in series with coil 81 of a solenoid valve (not shown) which controls admission of pressurized air to cylinder 57 of the inverter mechanism. The coils of time delay relays TD2 and TD4 are shunted across solenoid coil 81. The contacts of time delay relay TD4 are not shown. Preferably, this relay has a delay of approximately 4 seconds. The contacts of this relay control the unstacker to prevent it from discharging additional cases onto the run-off section of the conveyor while the positioner is in operation. Also, the contacts of this relay can be used to reset the unstacker if that unit is automatically stopped by an upended case.

In operation, first and second stops 22 and 23 are normally retracted to the side of the conveyor. Third stop 25 and the plate 26 of inverter mechanism are located below conveyor 11. Consequently, properly inverted cases move along conveyor 11 without being engaged by any member of the positioner mechanism. The uppermost portion of these cases passes below sensor 43 so that that sensor is not actuated.

Figure 4:
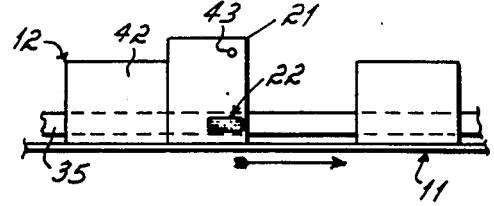
FIG. 4 is a view similar to FIG. 3 showing the upended case being restrained by a first stop of the positioner.

When an upended case, such as case 21 (FIG. 2), moves along the conveyor, it actuates sensor 43, e.g., by interrupting the beam of light from the light source to the photoelectric receiver. This causes photosensitive switch 74 to close, energizig solenoid coil 75 and time delay relay TD3 and TD1. When coil 75 is energized, the valve of which it is a part applies pressure to cylinder 27 of first stop 22. Stop plate 31 is advanced to wedge upended case 21 against rail 35. Conveyor chains 18 and 20 pass under this case, while the succeeding cases, such as case 42, are brought into abutment with case 21. The preceding case continues to move along conveyor 11 as shown in FIG. 4.

Normally closed contacts CD3 of time delay relay TD3 open and normally open contacts CD3' close after about one-half secod. When contacts CD3 open, solenoid 75 is deenergized so that the ram associated with first stop cylinder 27 is retracted, retracting stop member 31. The first stop thus releases upended case 21 for continued movement along the conveyor 11. However, the interval during which case 21 was held is sufficient to permit the preceding case to move along the conveyor past the third stop and a distance at least equal to the height of case 21 so that that case can subsequently be overturned and inverted, as illustrated in FIGS. 7 and 8, without engagement with the preceding case.

At the same time, the contacts CD3 are opened, contacts CD3' are closed and solenoid coil 78 is energized. The valve associated with this coil applies pressure to cylinder 36 of second stop 23 and cylinder 51 of third stop 25. The second stop plate 40 is advanced and clamps the succeeding case 42 against rail 35. Pressure applied to cylinder 51 causes third stop member 46 to be elevated so that it engages the leading edge of case 21 as shown in FIG. 6. Stop member 46 is substantially narrower than case 21 so that the case can be pivoted over the stop as shown in FIGS. 7 and 8.

When relay TD1 was energized, it contacts CD1 closed instantaneously to hold relay TD1 energized, even though photoelectric switch PSI should be opened due to the sensing of one of the openings in lattice work 16. Normally open contacts CD1' of time delay relay TD1 are energized a short interval later, i.e., after case 21 has had time to move a sufficient distance so that the leading edge of case 21 has been brought into engagement with stop plate 46. When these contacts are closed, solenoid coil 81 is energized, applying pressure to cylinder 57 of the inverter mechanism. This causes the inverter plate 26 to pivot upwardly, tipping case 21 forwardly onto conveyor 11 as illustrated in FIGS. 7 and 8.

Time delay relay TD3 is deenergized when contacts CD2 of relay TD2 are opened and photoelectric switch 74 is opened by the tilting of case 21 out of the path of the light beam to photoelectric receiver of detector 43 (see FIG. 7). When contacts CD3' of this relay open, solenoid coil 78 is deenergized, lowering the third stop to permit continued movement of case 21 (FIG. 8). At the same time, the ram of cylinder 36 of the second stop is retracted so that stop plate 40 is shifted outwardly to free succeeding case 42 for movement along the conveyor 11. It is to be understood that the third stop is spaced from second stop 23 a distance greater than the height of case 12 so that that case can be pivoted around the third stop without engaging a succeeding case 42 held by the second stop.

When relay TD1 is deenergized, its contacts CD1' open, deenergizing solenoid coil 81. When this coil is deenergized, its associated valve causes retraction of the ram of cylinder 57, causing the inverter plate 54 to be lowered beneath conveyor 11. All elements of the case positioner are thus returned to their original position in which they do not impede movement of cases along conveyor 11.

From the foregoing disclosure of the general principles of the present invention and the above description of a preferred embodiment, those skilled in the art will readily comprehend various modifications to which the invention is susceptible. Therefore, I desire to be limited only by the scope of the following claims.

Having described my invention, I claim:

1. A case positioner for sensing the presence of and inerting only an upended case moving in a series of cases including inverting and upended cases along a conveyor behind a preceding case and ahead of a succeeding case, said positioner comprising:
   a detector including a sensor for sensing the presence of an upended case;
   first stop means responsive to the actuation of said sensor for stopping said upended case;
   second stop means spaced upstream of said first stop means for stopping said succeeding case; and
   a selectively operable third stop spaced downstream of said first stop and responsive to said sensor for engaging the leading edge of said upended case; and
   an inverter mechanism disposed adjacent said third stop for pivoting said upended case forwardly over said third stop.

2. The case positioner of claim 1 further comprising:
   control means for controlling said first, second and third stops and said inverter mechanism, said control means being effective to advance said first stop into case-engaging position upon detection of an upended case;
   said control means further being effective to release said first stop after said preceding case has moved a distance along said conveyor, said control means being effective to advance said second stop and said third stop, whereby said second stop halts movement of said succeeding case and said third stop is positioned to engage the leading edge of said upended case, said control means being thereafter effective to actuate said inverter mechanism, causing said mechanism to pivot said upended case over said third stop, said control further being effective to retract said second and third stops and said inverter mechanism.

3. The case positioner of claim 1 in which said first and second stops are shiftable laterally of said conveyor between a retracted position and an advanced position in which they engage a case, and said third stop is shifted vertically between a retracted position below said conveyor and an advanced position in which said third stop projects above said conveyor.

4. The case positioner of claim 3 in which said inverter mechanism includes an inverter plate which is shifted between a retracted position below said conveyor and a position elevated above said conveyor.

5. The case positioner of claim 2 in which said first and second stops are shiftable laterally of said conveyor between a retracted position and an advanced position in which they engage a case, and said third stop is shifted vertically between a retractd position below said conveyor and an advanced position in which said third stop projects above said conveyor.

6. The case positioner of claim 5 in which said inverter mechanism includes an inverter plate which is shifted between a retracted position below said conveyor and a position elevated above said conveyor.

7. The case positioner of claim 1 in which said third stop is spaced from said first stop a distance further than the height of the case.

8. The case positioner of claim 2 in which said first stop remains advanced to retard said upended case for a sufficient time to permit said preceding case to move past said third stop.

9. The case positioner of claim 2 in which said first stop remains advanced to retard said upended case for a sufficient time to permit said preceding case to move a distance greater than the length of a case.

* * * * *